United States Patent [19]

Ikegaya et al.

[11] Patent Number: 4,915,122
[45] Date of Patent: Apr. 10, 1990

[54] SHOCK ACTUATED VALVE

[75] Inventors: Takashi Ikegaya, Tokyo, Japan; Richard D. Sibley, Anaheim; William F. Keller, San Dimas, both of Calif.

[73] Assignee: Koso International, Inc., Santa Fe Springs, Calif.

[21] Appl. No.: 342,330

[22] Filed: Apr. 24, 1989

[51] Int. Cl.⁴ .............................................. F16K 17/36
[52] U.S. Cl. ....................................... 137/38; 251/74
[58] Field of Search ................ 137/38, 39, 45; 251/74

[56] References Cited

U.S. PATENT DOCUMENTS

| | | | |
|---|---|---|---|
| 3,791,396 | 2/1974 | Nelson | 137/38 |
| 4,185,507 | 1/1980 | Domyan | 74/2 |
| 4,475,565 | 10/1984 | Keller et al. | 137/39 |
| 4,503,717 | 3/1985 | Keller et al. | 137/38 X |
| 4,513,629 | 4/1985 | Keller et al. | 137/38 X |
| 4,542,760 | 9/1985 | Flauiani | 137/45 |
| 4,603,591 | 8/1986 | Sibley et al. | 137/38 X |

Primary Examiner—Robert G. Nilson
Attorney, Agent, or Firm—William P. Green

[57] ABSTRACT

A shock actuated valve including a first structure mounted to swing about a first axis and which is releasably retained by a first latch in a first position, with the latch being automatically releasable when the device is subjected to earthquake forces or other shock forces, and a second structure including a valve and which is mounted to swing about a second axis and is releasably retained in an open valve position by a second latch controlled by the first swinging structure. When shock forces cause release of said first structure for swinging movement from its reset position, such swinging movement automatically releases the second structure and its valve for spring urged swinging movement in a direction closing the valve.

24 Claims, 6 Drawing Sheets

SHOCK ACTUATED VALVE

This invention relates to improved valve devices for automatically closing off the flow of a fluid, such as natural gas, when the device is subjected to earthquake forces or other similar shock forces.

BACKGROUND OF THE INVENTION

U.S. Pat. No. 4,475,565 issued Oct. 9, 1984 shows an earthquake valve including a weight in the form of a ball which is normally supported on the upper surface of a pedestal and which is displaceable laterally by shock forces to engage and deflect downwardly a tubular element disposed about the pedestal. Downward movement of the tubular element acts through a parallelogram mechanism to release a latch element and permit swinging movement of an arm carrying a valve, thus automatically closing the valve. The mechanism of this prior patent is very effective in reliably responding to shock forces, but is limited as to the size of valve which can be actuated by the device. The direct acting nature of the mechanism prevents it from exerting enough force to close a pipeline of the size required for many large scale users of gas, such as industrial plants or the like.

SUMMARY OF THE INVENTION

The purpose of the present invention is to provide an improved shock responsive device capable of closing a valve much larger in size than the valves of U.S. Pat. No. 4,475,565. Further, the mechanism of the present invention preferably actuates the controlled valve entirely mechanically, to avoid the necessity for provision of an auxiliary pnuematic, electrical or other power source, and thereby prevent any problems which might be caused by failure of such a power source. The device is easily and quickly resettable, functions in a very positive manner assuring reliability in response to shock forces, and affords a very direct indication to an operator at all times of the internal open or closed condition of the valve.

A unit embodying the invention includes two structures mounted for swinging movement about two separate preferably parallel axes, with a first of the structures being controlled directly by a shock sensing element, and with the second of the swinging structures carrying the valve and being controlled by movement of the first structure. The two structures are yieldingly urged in predetermined directions, desirably by individual coil springs, and are manually actuable or resettable in the opposite direction to positions in which they are retained by separate latches. One of these latches is carried by the first of the swinging structures and is engageable with the second structure in latching relation when the two structures are in their completely reset cocked positions in which the valve is held in its open setting.

Resetting of the mechanism is attained by manually swinging the second of the structures, that is, the one which carries the valve, with that structure acting upon swinging movement to engage the other of the structures and deflect it to cocked position.

BRIEF DESCRIPTION OF THE DRAWINGS

The above and other features and objects of the invention will be better undestood from the following detailed description of the typical embodiment illustrated in the accompanying drawings, in which.

DESCRIPTION OF THE PREFERRED EMBODIMENT

Figure 1:
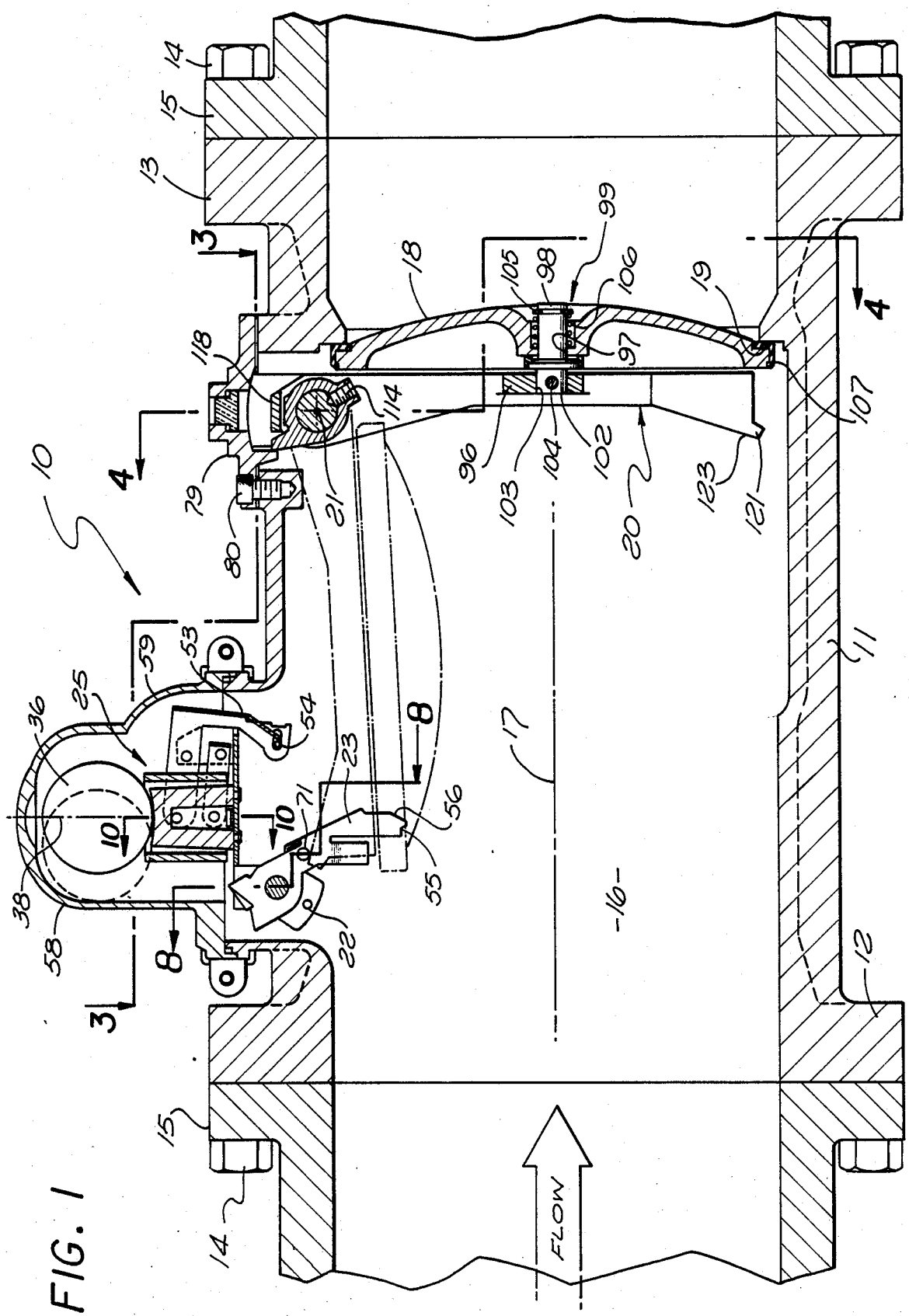
FIG. 1 is a central vertical sectional view through a shock actuated valve assembly embodying the invention, and showing the controlled valve in a closed position.
Figure 10:
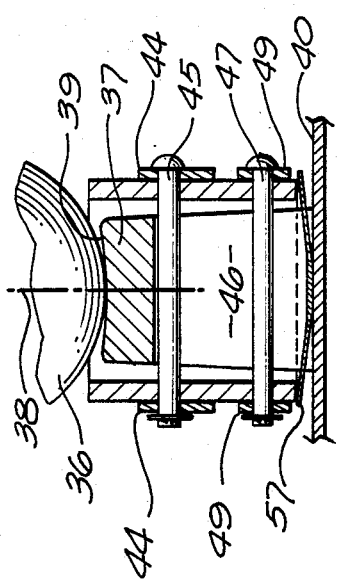
FIG. 10 is a fragmentary vertical section taken on line 10—10 of FIG. 1.

Referring first to FIG. 1, there is illustrated at 10 in that figure a shock responsive valve assembly which is adapted to automatically close off the flow of a controlled fluid such as natural gas through a pipeline in response to earthquake foces or other shock forces of predetermined magnitude. The device includes a tubular main body 11 having flanges 12 and 13 at its opposite ends connectable by bolts 14 to abutting flages 15 of adjacent pipe sections to connect the body into a pipeline. It may be assumed that natural gas or another controlled fluid flows in a left to right direction as viewed in FIG. 1 through an inner passage 16 in body 11, and parallel to a central horizontal axis 17 of that passage.

The flow controlling mechanism of FIG. 1 includes a circular valve element 18 which is engageable with an annular seat 19 formed in body 11 to close off the flow of fluid through the device in the FIG. 1 position of the valve. Valve 18 is carried by an arm 20 which swings about a horizontal axis 21 between the closed position of FIG. 1 and the open position of FIG. 2. Arm 20 and the carried valve disc 18 are releasably retainable in the FIG. 2 open position of the valve by engagement of arm 20 with a latch pin 22 carried by a second arm 23 which is mounted for swinging movement about a horizontal axis 24 between the positions of FIGS. 1 and 2. Arm 23 is in turn releasably retainable in its FIG. 2 position by a shock actuated control mechanism 25.

The shock responsive mechanism 25 includes a weight or mass 36 which may take the form of a metal ball. When valve 18 is in its FIG. 2 open condition, ball 36 is supported on a pedestal 37 extending upwardly along a vertical axis 38, with the center of the ball located on that axis. The pedestal may be externally cylindrical about axis 38, and contain an upwardly facing shallow circular recess 39 at its upper end centered about axis 38 and of a depth and contour to normally retain ball 36 in its centered position. The ball is displaceable from that position relative to the pedestal, as to the position represented in broken lines in FIG. 1, by shock induced movement of the pedestal relative to the ball, during which movement the inertia of the weight resists movement thereof with the pedestal. Pedestal 37 may be attached rigidly at its lower end to a horizontal base plate 40 which is in turn rigidly attached to body 11 by screws 41 (FIG. 3), in a position of extension across a generally circular opening 26 formed in the upper side of body 11.

A vertical tube 42 centered about axis 38 is disposed about and spaced from pedestal 37, and is movable upwardly and downwardly relative to the pedestal. The tube is mounted for its vertical movement by a parallelogram mechanism 43, including two similar parallel upper links 44 each pivoted at one end to the tube by a horizontal pin 45 extending through a vertical slot 46 in pedestal 37, and each pivoted by a second parallel horizontal pin 47 to a pair of vertical bracket arms 48 projecting upwardly from and attached rigidly to plate 40. The parallelogram mechanism also inlcudes two similar parallel lower links 49 each pivoted by a first pin 50 to tube 42 and by a second pin 51 to bracket arms 48.

Figure 2:
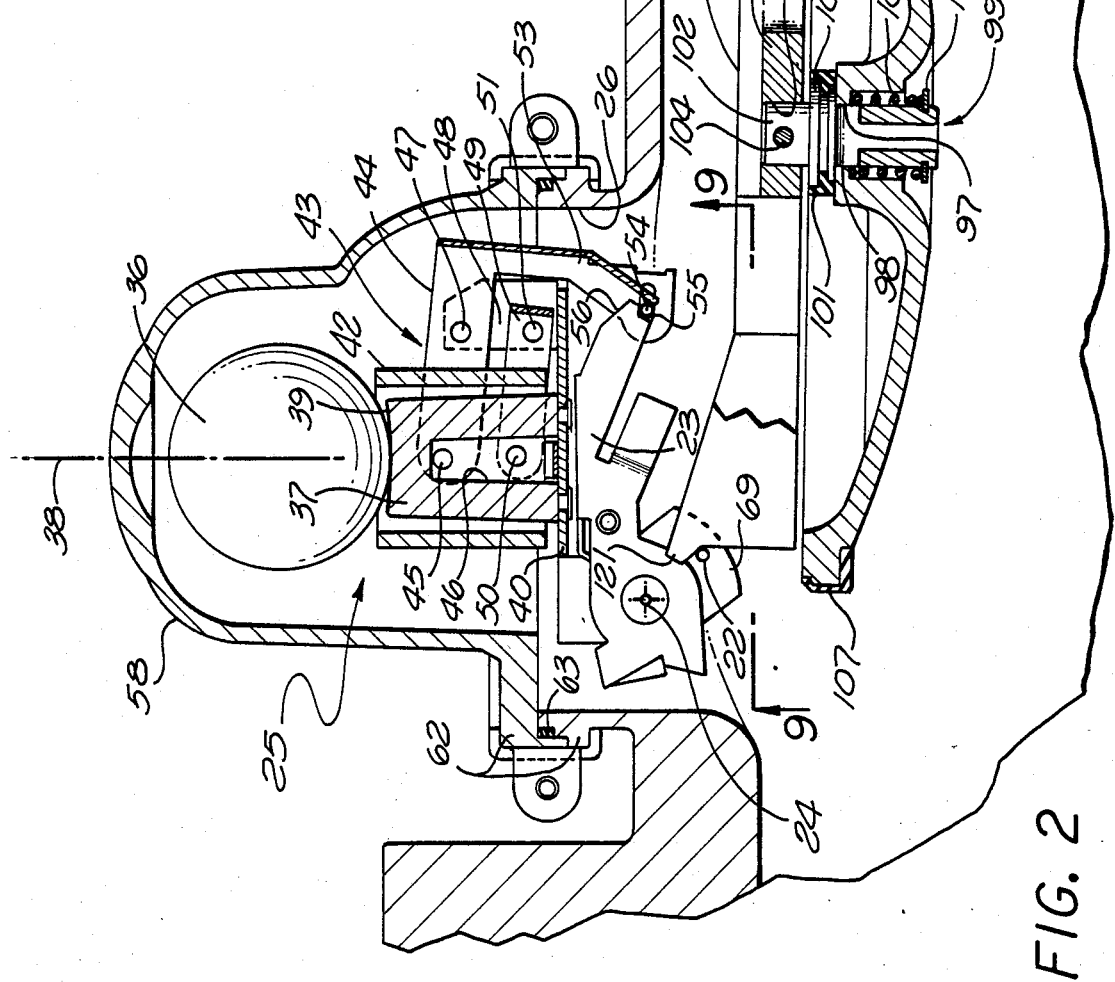
FIG. 2 is a fragmentary vertical sectional view similar to the upper portion of FIG. 1, but showing the valve in opened condition.
Figure 3:
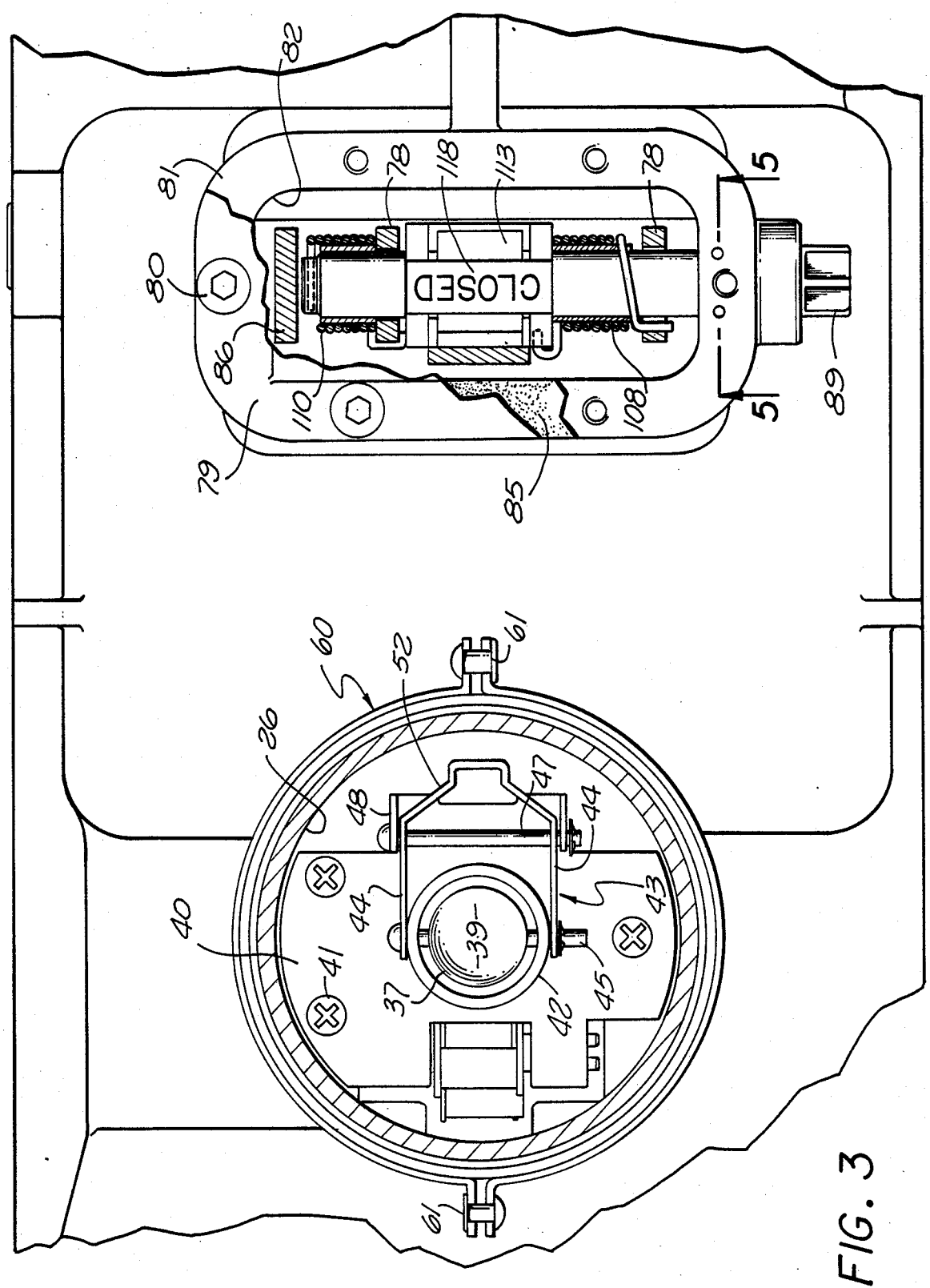
FIG. 3 is a horizontal section taken essentially on line 3—3 of FIG. 1.

The two upper links 44 may be stamped integrally from a single piece of sheet metal, forming a cross piece 52 at the right ends of the links as seen in FIG. 3, and forming a projection 53 extending downwardly from the right ends of links 44 carrying a cross pin 54 which acts to engage and latch arm 23 in its FIG. 2 cocked position. For engagement with this latching cross pin 54, arm 23 contains a notch or recess 55 within which pin 54 is received in the FIG. 2 position of arm 23 to retain the arm against downward swinging movement from that position. A cam surface 56 formed on arm 23 deflects pin 54 upon upward swinging movement of the arm in a manner allowing the arm to pass the pin and permit movement of the pin into its latched position within notch 55.

By virtue of the parallelogram mounting of tube 42, downward movement of the tube causes rightward swinging movement of cross pin 54 to release arm 23 for its clockwise or downward swinging movement. The tube is yieldingly urged upwardly in any appropriate manner, as by provision of a leaf spring or plate spring 57 secured at a central location to plate 40 and having end portions urged upwardly and applying yielding upward force to tube 42 at diametrically opposite locations. When ball 36 is moved laterally from its centered position in any horizontal direction relative to pedestal 37, as to the broken line position of FIG. 1, the weight engages the upper edge of tube 42 and displaces the tube downwardly relative to the pedestal to move pin 54 out of notch 55 in arm 23 and allow downward swinging movement of the arm.

Ball 36 and its associated parts are enclosed within a dome shaped housing 58 which is attached to and projects upwardly from valve body 11, and which may be essentially symmetrical with respect to axis 38 except at the location of an enlargement or bulge 59 at its right side as seen in FIG. 1. Housing 58 is secured to body 11 by an annular clamp assembly 60 typically formed of two semi-circular sections secured together at their opposite ends by screws, rivets, or other fasteners represented at 61. This clamp assembly 60 contains an annular groove or recess receiving annular flanges 62 of parts 11 and 58 to secure them tightly together and in annular sealing engagement with a rubber O-ring 63 or other gasket. Thus, housing 58 effectively closes opening 26 at the upper side of body 11. Lateral displacement of ball 36 by shock forces is limited by engagement of the ball with the side wall of housing 58. When the ball is in any laterally displaced position of engagement with the side wall of housing 58, the ball is in contact with the upper edge of tube 42 in a relation actuating it downwardly by the weight of the ball and relative to pedestal 37. In this condition, the point of contact of tube 42 with the underside of the ball is beyond the vertical central axis of the ball in a direction outwardly away from axis 38, so that upon cessation of the shock forces or other forces which displace the ball, the upward force applied to the ball by tube 42 will be at a location causing the ball to be cammed inwardly to its original centered position on the pedestal. The ball thus automatically resets itself in the FIG. 1 centered position when permitted to do so.

Figure 8:
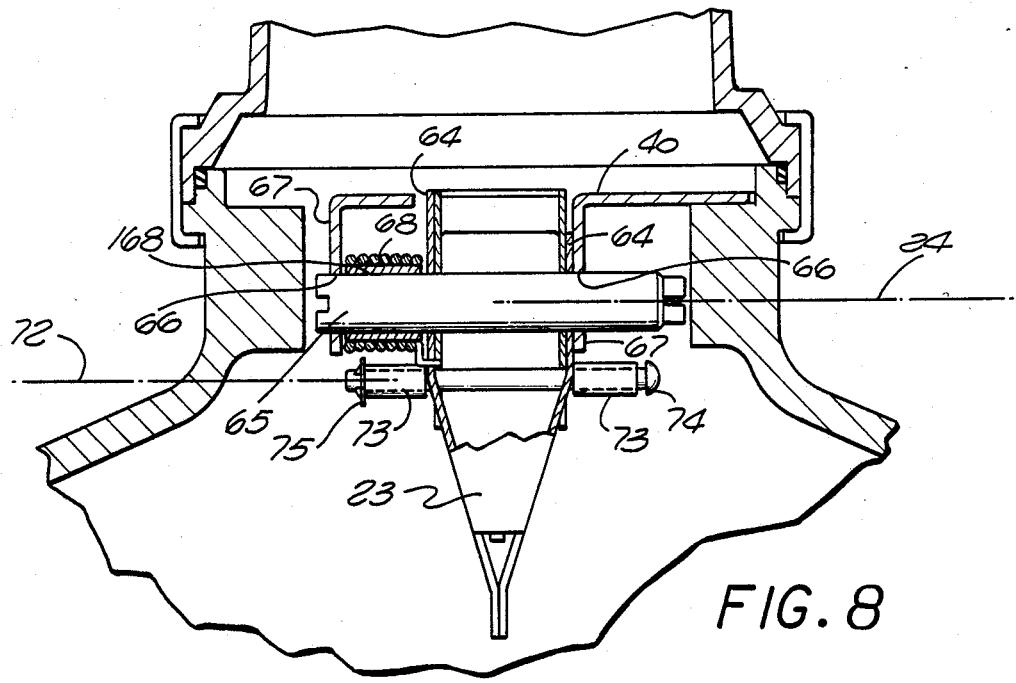
FIG. 8 is a fragmentary generally vertical section taken on line 8—8 of FIG. 1.

The swinging arm 23 which is controlled by latch pin 54 may be stamped of sheet metal deformed to the illustrated configuration and having two spaced parallel vertical portions 64 (FIG. 8) at its upper end containing aligned openings through which a cylindrical mounting shaft 65 extends to mount arm 23 for its swinging movement about axis 24. Shaft 65 may be mounted in the illustrated position centered about pivotal axis 24 by reception of the shaft within aligned bearing openings 66 in two spaced vertical members 67 which may be formed as downwardly turned portions of the previously mentioned horizontal sheet metal plate 40.

Arm 23 is yieldingly urged pivotally, in a clockwise direction as viewed in FIG. 1, and to the FIG. 1 position, by a coil spring 68 disposed about the shaft and having its opposite ends engaged with the arm 23 and with one of the portions 67 of plate 40. A tubular sleeve 168 may be received radially between shaft 65 and spring 68.

Figure 9:
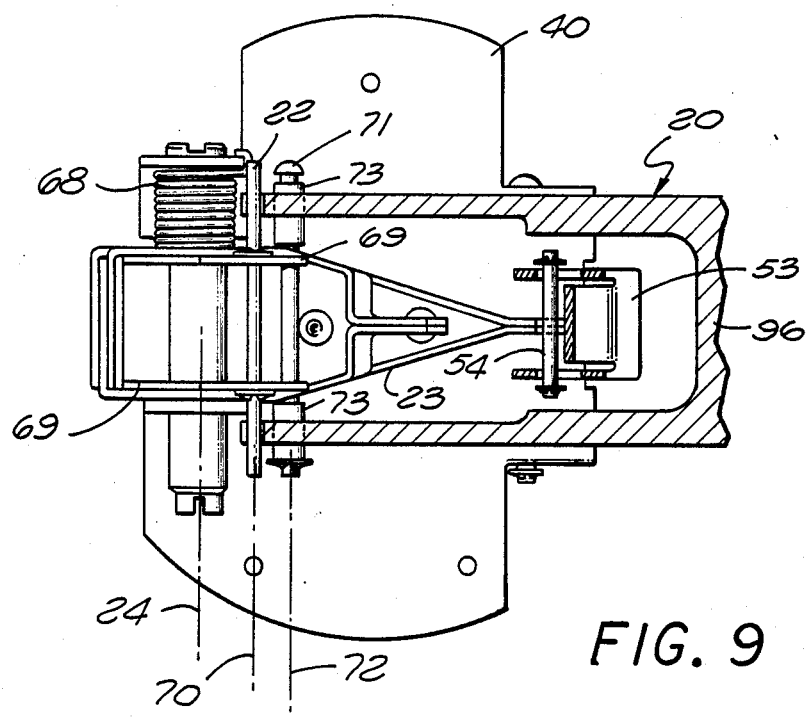
FIG. 9 is a fragmentary view taken on line 9—9 of FIG. 2.

Pin 22 is attached rigidly to two parallel vertical plates 69 carried rigidly by arm 23, with the opposite ends of pin 22 projecting in opposite directions beyond plates 69 and along an axis 70 which is parallel to axes 21 and 24 of the two swinging arms. A second pin 71 is carried by arm 23 at a location offset from pin 22, and extends along an axis 72 parallel to axes 70, 21 and 24. The ends of pin 71 project in opposite directions from and beyond arm 23 (see FIGS. 8 and 9) with short tubes 73 disposed about the end portions of pin 71 and being centered about axis 72 and being retained on the pin by a head 74 formed at one end of the pin and a retaining ring or washer 75 attached to its opposite end.

The second swinging arm 20 which carries valve 18 is considerably longer than arm 23, and is mounted for its swinging movement by a second shaft 76 (FIG. 4) journalled for rotary movement about axis 21 by reception within aligned circular openings 77 formed in two parallel vertical walls 78 carried by and projecting downwardly from a generally horizontal cover member 79 which is attached by a series of screws 80 to a flange 81 formed at the upper side of body 11. As seen in FIG. 3, flange 81 defines a horizontally elongated opening 82 in the upper side of body 11 which is closed by cover 79 and through which arm 20 is insertable downwardly into body 11. Cover 79 has a central opening 83 closed by a transparent window 84 which is sealed with respect to the cover and allows a user to look downwardly into the interior of body 11 to determine the open or closed condition of the valve. A gasket 85 is provided between cover 79 and flange 81 of body 11 to form a fluid tight seal at the location of opening 82. A third wall or projection 86 extending downwardly from cover 79 is engageable with the right end of shaft 76 as viewed in FIG. 4 to retain the shaft against rightward movement from its illustrated position. Shaft 76 is adapted to be turned manually to reset the mechanism by actuation of a stub shaft 87 which projects leftwardly through a passage 88 to the exterior of body 11, and has a square or other non-circular portion 89 at the outside of the body for engagement with a tool to turn the shafts. At its inner end, stub shaft 87 has a tongue or projection 90 exteding into a coacting diametrically extending groove 91 in the end of shaft 76, to transmit rotary motion from stub shaft 87 to shaft 76. Seal rings 92 prevent the escape of any fluid from the interior of body 11 through passage 88 and along the outside of stub shaft 87. The stub shaft is retained in its illustrated assembled position by two vertical pins 125 (FIG. 5) which are insertable downwardly within parallel passages 93 in body 11 to positions of reception within opposite side portions of an annular groove 94 formed in shaft 87, to lock shaft 87 against axial movement.

Figure 4:
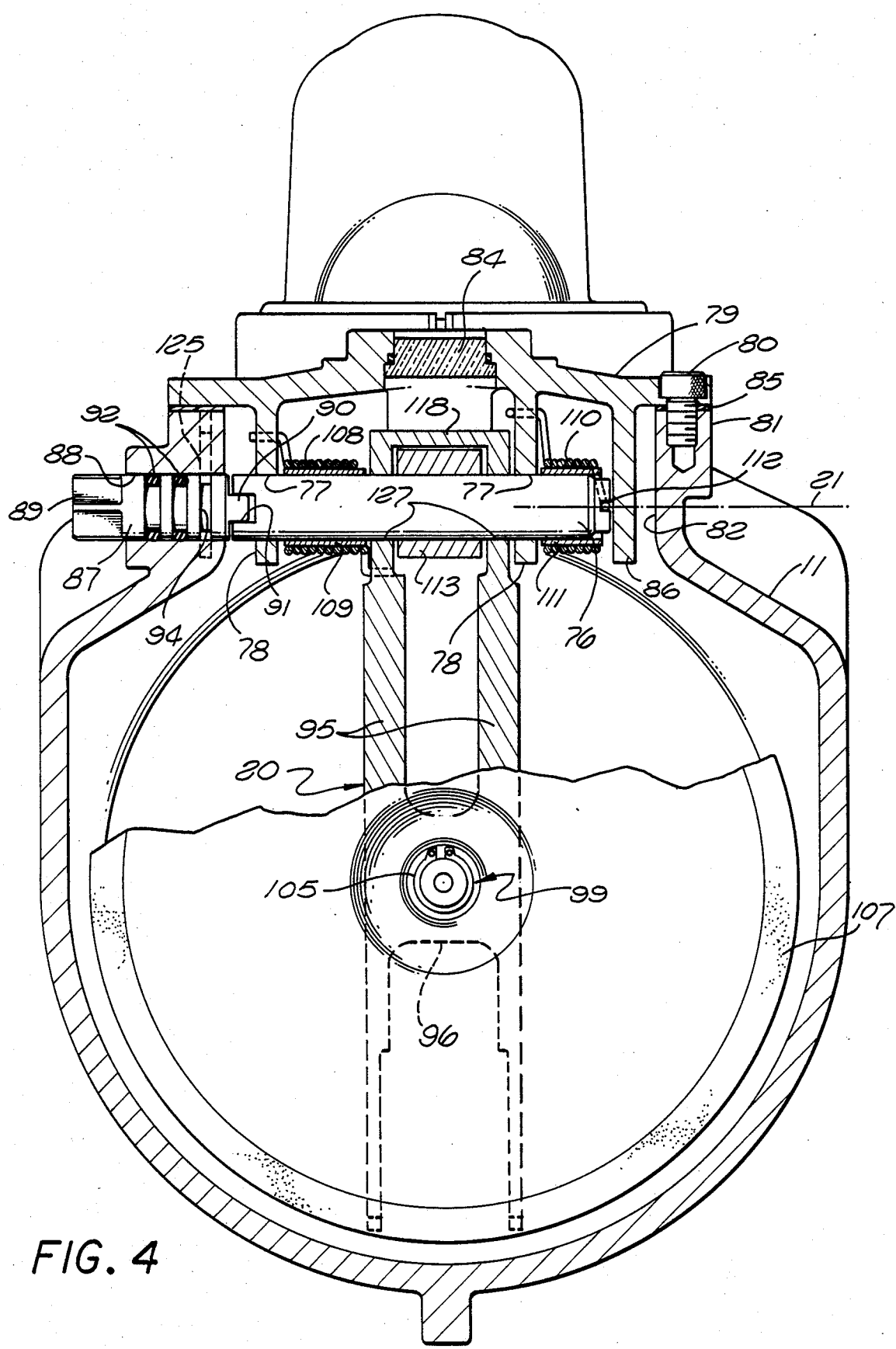
FIG. 4 is a transverse vertical section taken on line 4—4 of FIG. 1.
Figure 11:
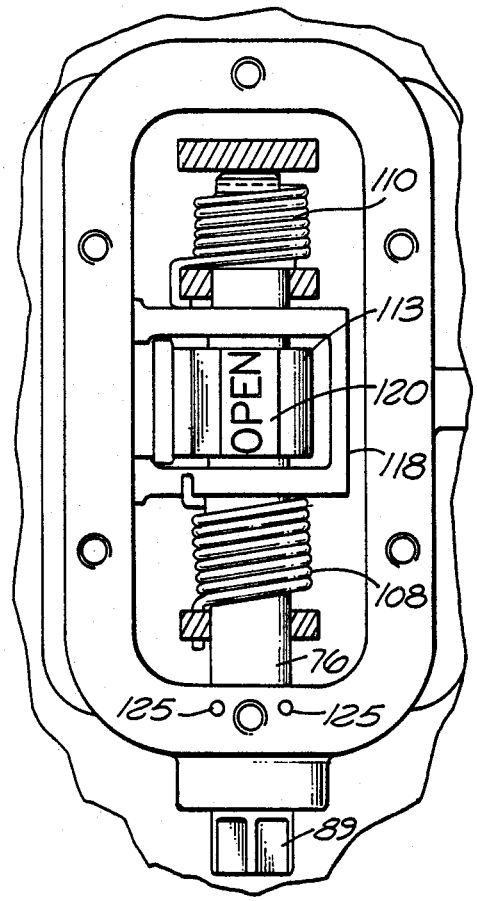
FIG. 11 is a horizontal section taken on line 11—11 of FIG. 2.
Figure 6:
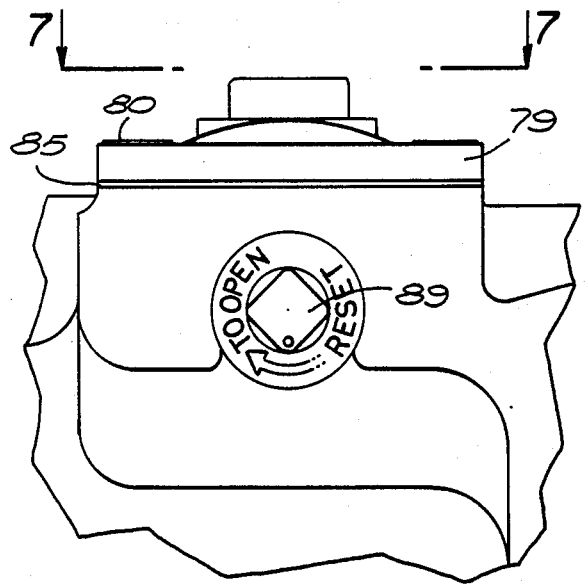
FIG. 6 is a fragmentary side elevational view taken on line 6—6 of FIG. 4.
Figure 5:
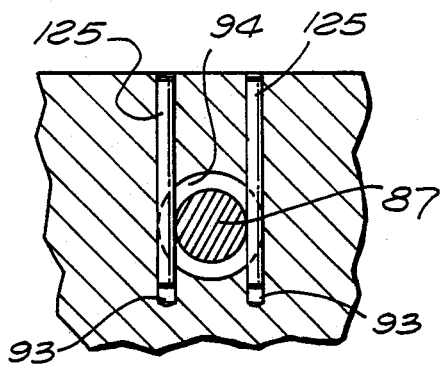
FIG. 5 is a fragmentary vertical section taken on line 5—5 of FIG. 3.
Figure 7:
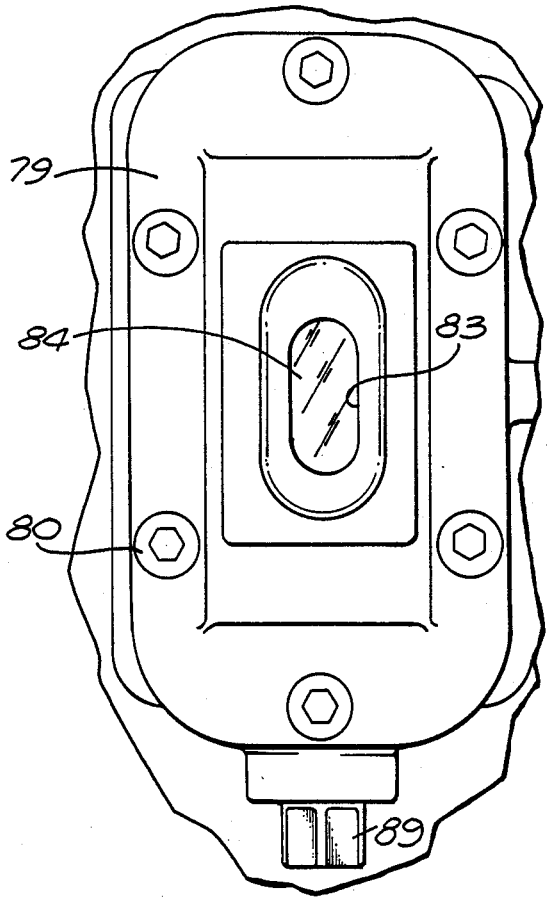
FIG. 7 is a fragmentary top plan view taken on line 7—7 of FIG. 6.

Arm 20 may be shaped as illustrated in FIG. 4, having two elongated essentially parallel portions 95 integrally connected together at a central location by a cross piece 96 to which valve 18 is connected in a manner allowing slight limited movement of the valve relative to arm 20 to enable the valve to adjust itself to and tightly annularly engage seat 19. As seen in FIGS. 1 and 2, the valve has a central circular opening 97 into which a cylindrical portion 98 of a connector member 99 projects, with an enlarged annular flange 100 of member 99 being received at a left side of the valve disc 18 as viewed in FIG. 1. Flange 100 may be encased within an annular peripheral coating 101 of rubber or soft resinous plastic material, for cushioning contact of the valve with the flange. Beyond flange 100, member 99 has an externally cylindrical portion 102 which projects into a circular opening 103 in the central portion 96 of arm 20, and which is retained in that position of reception within passage 103 by extension of a pin 104 transversely through portion 96 of the arm portion 102 of member 99. At its right end as viewed in FIG. 1, member 99 may carry a retaining ring 105, received within a peripheral groove in member 99 and acting to retain a coil spring 106 which is confined between valve 18 and ring 105 to allow limited adjusting movement of the valve relative to member 99 for proper engagement with seat 19. The periphery of valve 18 may be provided with an annular layer 107 of rubber or soft resinous plastic material for engagement with seat 19 in sealing relation.

Near their upper extremities, the two parallel portions 95 of arm 20 contain aligned circular openings 127 dimensioned in correspondence with the exterior cylindrical surface of shaft 76 to engage that surface in a manner effectively mounting arm 24 for its swinging movement about the shaft and about axis 21. Arm 20 is yieldingly urged pivotally from its FIG. 2 position to its FIG. 1 position, to close the valve, by a coil spring 108 which is received about shaft 76 to the left of arm 20 as seen in FIG. 4, and which has its opposite ends turned into engagement with arm 20 and one of the portions 78 of cover 79 in a relation urging the arm toward its FIG. 1 position. A sleeve 109 may be received about shaft 76 radially between that shaft and spring 108 as shown. Toward the right end of shaft 76 as viewed in FIG. 4, another coil spring 110 is disposed about the shaft with a sleeve 111 received between the spring and shaft, and one end of the spring turned into engagement with a second of the portions 78 of cover 79, and the second end of the spring 110 extending into a diametrical groove 112 formed in the end of shaft 76. This spring 110 functions to yieldingly urge shaft 76 in a counterclockwise direction as viewed in FIG. 1.

At a location between the two portions 95 of arm 20, an element 113 is carried about shaft 76 and rigidly attached thereto. As seen in FIGS. 1 and 2, a set screw 114 threadedly connected into element 113 is tightenable against shaft 76 and into a recess 115 formed in the shaft, to positively lock element 113 in fixed position relative to shaft 76. Element 113 has a projection 116 which is engageable with a lug 117 formed on the underside of cover 79 to limit counterclockwise rotary movement of element 113 and the connected shaft 76 in the FIGS. 1 and 2 position of those parts.

At the upper ends of portions 95 of arm 20, the material of arm 20 forms an upper wall or cross-piece 118 extending transversely between portions 95, and which extends generally horizontally beneath window 84 for viewing through the window in the FIGS. 1 and 4 position of the parts. The upper surface of crosspiece 118 which is visible through the window in the FIG. 1 position may be colored red to indicate that the valve is closed when that wall is visible, and may also carry the marking "Closed". When the valve is swung to its FIG. 2 open position, the indicator wall or cross-piece 118 is no longer visible through window 84.

The projection 116 of element 113 is positioned to engage portion 118 of arm 20 when shaft 76 and sleeve 113 are turned in a clockwise direction as viewed in FIG. 1, with this engagement of projection 116 with portion 118 acting to transmit clockwise rotary movement from element 113 to arm 20 and the valve to swing arm 20 and the valve from their FIG. 1 position to their FIG. 2 position, thereby resetting the valve to a condition in which it can respond to earthquake forces. Arm 20 and the valve are latched in their FIG. 2 position by engagement with pin 22 of arm 23, after which an operator can relase shaft 76 for return in a counterclockwise direction relative to arm 20 and to its FIG. 1 position in which projection 116 engages lug 117 of cover 79. It will thus be understood that element 113 provides a lost motion resetting connection between shaft 76 and arm 20 allowing that arm and the valve to be turned in a clockwise direction as viewed in FIG. 1 to their cocked or latched positions and then permitting returning rotary movement of the shaft and element 113 without corresponding returning movement of arm 20 and the valve.

When the valve is in its FIG. 2 cocked position and the shaft and element 113 are in their FIG. 2 position in which projection 116 is in engagement with lug 117, an operator can view through window 84 markings on an upwardly facing surface 120 formed on element 113 adjacent lug 116. The markings on that horizontal surface 120 beneath window may consist of the word "OPEN", indicating to the operator that the valve is in its open or cocked position and that element 113 has been returned by its spring to its FIG. 2 normal position. Unless both of these conditions occur simultaneously, the word "OPEN" will not appear to the operator, thus indicating that the inner mechanism is in some respect not properly set. When valve 18 is in its closed position, cross-piece 118 of arm 20 is received directly above the surface 120 on element 113, so that the word "OPEN" on surface 120 is not visible.

At their lower extremities, the two parallel portions 95 of arm 20 have similar terminal lugs 121 of the configuration illustrated in FIGS. 1 and 2. These lugs 121 are positioned to engage the sleeves 73 about opposite ends of pin 71 as arm 20 and the valve are swung in a clockwise direction from their FIG. 1 position toward their FIG. 2 position, with that engagement of lugs 121 and sleeves 73 acting to transmit force from arm 20 to arm 23 in a manner automatically swinging arm 23 in a counterclockwise direction from its FIG. 1 position to its FIG. 2 cocked position. This action commences when arm 20 reaches the broken line position of FIG. 1, in which position surfaces 123 formed on portions 95 of arm 20 engage sleeves 72 as shown and cause upward movement of those sleeves and pin 71 and the connected arm 23 as the clockwise upward swinging movement of arm 20 continues. The resultant counterclockwise swinging movement of arm 23 ultimately reaches a point at which cam surface 56 on that arm engages pin 54 and deflects it as previously discussed, enabling pin 54 to move into notch or recess 55 and thus releasably latch arm 23 in its FIG. 2 position. The final portion of this swinging movement of the two arms moves the opposite ends of the second pin 22 carried by arm 23 to positions beneath lugs 121 of arm 20, with the result that pin 22 then effectively latches arm 20 and the valve in their FIG. 2 open position.

To summarize the steps which are taken in placing the illustrated device in operation as an earthquake valve, assume that the device has been properly connected into a natural gas line or other fluid line, with the axis 38 extending directly vertically to support ball 36 effectively on the upper end of pedestal 37. To set the valve to its open position, an operator moves a wrench into engagement with non-circular portion 89 of stub shaft 87, and turns that shaft manually in a clockwise direction as viewed in FIG. 1, so that lug 116 swings arm 20 and the valve from their FIG. 1 position to the FIG. 2 position. During this swinging movement, arm 20 engages sleeves 73 on pin 71 as discussed to automatically reset arm 23 to its FIG. 2 position in which it is retained by latch pin 54, while arm 20 and the valve are ultimately retained in their cocked positions by pin 22. Upon release of the manual force exerted against stub shaft 87, that shaft and the connected shaft 76 are returned by their spring to the FIG. 2 normal setting, in which the word "OPEN" on the upper surface of the cam is visible through window 84. If ball 36 is at any time displaced laterally by shock forces, the resultant engagement of the ball with the upper edge of tube 42 causes downward displacement of that tube acting to release latch pin 54 permitting clockwise swinging movement of arm 23 to its FIG. 1 position, and simultaneous counterclockwise swinging movement of arm 20 to its FIG. 1 position in which valve 18 is closed. This closed condition is indicated by viewing of the word "CLOSED" on the upper surface of portion 118 of arm 20 through window 84.

While a certain specific embodiment of the present invention has been disclosed as typical, the invention is of course not limited to this particular form, but rather is applicable broadly to all such variations as fall within the scope of the appended claims.

We claim:

1. The combination comprising:
   a first structure mounted for swinging movement about a first axis;
   first yielding means urging said first structure about said first axis from a first position toward a second position;
   first latch means for releasably retaining said first structure in said first position;
   shock actuated mechanism responsive to shock forces to release said first latch means for movement of said first structure by said yielding means to said second position;
   a second structure including a valve and which is mounted to swing about a second axis;
   second yielding means urging said second structure toward a position in which the valve is closed; and
   second latch means releasably retaining said second structure in a position in which the valve is open and actuable by movement of said first structure toward said second position upon release of said first latch means to automatically release said second structure for valve closing movement;
   said first structure in moving from said second position to said first position thereof swinging generally toward said second structure and said second axis.

2. The combination comprising:
   a first structure mounted for swinging movement about a first axis;
   first yielding means urging said first structure about said first axis from a first position toward a second position;
   first latch means for releasably retaining said first structure in said first position;
   shock actuated mechanism responsive to shock forces to release said first latch means for movement of said first structure by said yielding means to said second position;
   a second structure including a valve and which is mounted to swing about a second axis;
   second yielding means urging said second structure toward a position in which the valve is closed; and
   second latch means releasably retaining said second structure in a position in which the valve is open and actuable by movement of said first structure toward said second position upon release of said first latch means to automatically release said second structure for valve closing movement;
   said second structure, in swinging from said position in which the valve is closed toward said position in which the valve is open, swinging generally toward said first structure and said first axis.

3. The combination comprising:
   a first structure mounted for swinging movement about a first axis;
   first yielding means urging said first structure about said first axis from a first position toward a second position;
   first latch means for releasably retaining said first structure in said first position;
   shock actuated mechanism responsive to shock forces to release said first latch means for movement of said first structure by said yielding means to said second position;
   a second structure including a valve and which is mounted to swing about a second axis;
   second yielding means urging said second structure toward a position in which the valve is closed; and
   second latch means releasably retaining said second structure in a position in which the valve is open and actuable by movement of said first structure toward said second position upon release of said first latch means to automatically release said second structure for valve closing movement;

said first structure, in moving from said second position to said first position, swinging generally toward said second structure and said second axis; and said second structure, in moving from said position in which the valve is closed to said position in which the valve is open, swinging generally toward said first structure and said first axis.

4. The combination as recited in claim 3, in which said first and second axes are parallel to one another.

5. The combination comprising:

a first structure mounted for swinging movement about a first axis;

first yielding means urging said first structure about said first axis from a first position toward a second position;

first latch means for releasably retaining said first structure in said first position;

shock actuated mechanism responsive to shock forces to release said first latch means for movement of said first structure by said yielding means to said second position;

a second structure including a valve and which is mounted to swing about a second axis;

second yielding means urging said second valve structure toward a position in which the valve is closed;

second latch means releasably retaining said second structure in a position in which the valve is open and actuable by movement of said first structure toward said second position upon release of said first latch means to automatically release said second structure for valve closing movement; and means for manually resetting said second structure to said position in which said valve is open, and said first structure to said first position thereof.

6. The combination comprising:

a first structure mounted for swinging movement about a first axis;

first yielding means urging said first structure about said first axis from a first position toward a second position;

first latch means for releasably retaining said first structure in said first position;

shock actuated mechanism responsive to shock forces to release said first latch means for movement of said first structure by said yielding means to said second position;

a second structure including a valve and which is mounted to swing about a second axis;

second yielding means urging said second structure toward a position in which the valve is closed;

second latch means releasably retaining said second structure in a position in which the valve is open and actuable by movement of said first structure toward said second position upon release of said first latch means to automatically release said second structure for valve closing movement; and means for manually resetting said first and second latch means.

7. The combination comprising:

a first structure mounted for swinging movement about a first axis;

first yielding means urging said first structure about said first axis from a first position toward a second position;

first latch means for releasably retaining said first structure in said first poisition;

shock actuated mechanism responsive to shock forces to release said first latch means for movement of said first structure by said yielding means to said second position;

a second structure including a valve and which is mounted to swing about a second axis;

second yielding means urging said second structure toward a position in which the valve is closed;

second latch means releasably retaining said second structure in a position in which the valve is open and actuable by movement of said first structure toward said second position upon release of said first latch means to automatically release said second structure for valve closing movement; and means acting to automatically reset said first structure from said second position thereof to said first position upon movement of said second structure from said position in which the valve is closed to said position in which the valve is open.

8. The combination comprising:

a first structure mounted for swinging movement about a first axis;

first yielding means urging said first structure about said first axis from a first position toward a second position;

first latch means for releasably retaining said first structure in said first position;

shock actuated mechanism responsive to shock forces to release said first latch means for movement of said first structure by said yielding means to said second position;

a second structure including a valve and which is mounted to swing about a second axis;

second yielding means urging said second structure toward a position in which the valve is closed;

second latch means releasably retaining said second structure in a position in which the valve is open and actuable by movement of said first structure toward said second position upon release of said frist latch means to automatically release said second structure for valve closing movement; and means carried by and swinging with said second structure and positioned to engage and deflect said first structure in a relation actuating said first structure from said second position thereof to said first position thereof upon swinging movement of said second structure from said position in which said valve is closed to said position in which said valve is open.

9. The combination comprising:

a first structure mounted for swinging movement about a first axis;

first yielding means urging said first structure about said first axis from a first position toward a second position;

first latch means for releasably retaining said first structure in said first position;

shock actuated mechanism responsive to shock forces to release said first latch means for movement of said first structure by said yielding means to said second position;

a second structure including a valve and which is mounted to swing about a second axis;

second yielding means urging said second structure toward a position in which the valve is closed;

second latch means releasably retaining said second structure in a position in which the valve is open and actuable by movement of said first structure toward said second position upon release of said first latch means to automatically release said second structure for valve closing movement; and means for manually swinging said second structure from said position in which the valve is closed to said position in which the valve is open to reset the valve;

said second structure having a portion which, upon manual movement of said second structure to said open position of the valve, is engageable with said first structure to move it from said second position thereof to said first position for retention in said first position by said first latch means.

10. The combination as recited in claim 9, in which said first structure includes a pin extending essentially parallel to said first and second axes and mounted to swing with the remainder of said first structure and which is engaged by said portion of said second structure to reset the first structure in response to swinging movement of the second structure.

11. The combination as recited in claim 10, in which said second latch means include a second pin carried by and swinging with said first structure at a location offset from said first axis and which is engageable with a shoulder on said second structure to retain the second structure in said position in which said valve is open.

12. The combination comprising:
a first structure mounted for swinging movement about a first axis;
first yielding means urging said first structure about said first axis from a first position toward a second position;
first latch means for releasably retaining said first structure in said first position;
shock actuated mechanism responsive to shock forces to release said first latch means for movement of said first structure by said yielding means to said second position;
a second structure including a valve and which is mounted to swing about a second axis;
second yielding means urging said second structure toward a position in which the valve is closed;
second latch means releasably retaining said second structure in a position in which the valve is open and actuable by movement of said first structure toward said second position upon release of said first latch means to automatically release said second structure for valve closing movement; and
a resetting member which is manually movable rotatively about said second axis to swing said second structure in a first direction about said second axis and to said position in which said valve is open, and which has a lost motion connection to said second structure enabling returning movement of said resetting member rotatively about said second axis in an opposite direction and independently of said second structure while the second structure remains in said position in which said valve is open.

13. The combination as recited in claim 12, including means yieldingly urging said resetting member rotatively about said second axis in said opposite direction while said second structure remains in said position in which said valve is open.

14. The combination comprising:

a first structure mounted for swinging movement about a first axis;
first yielding means urging said first structure about said first axis from a first position toward a second position;
first latch means for releasably retaining said first structure in said first position;
shock actuated mechanism responsive to shock forces to release said first latch means for movement of said first structure by said yielding means to said second position;
a second structure including a valve and which is mounted to swing about a second axis;
second yielding means urging said second structure toward a position in which the valve is closed;
second latch means releasably retaining said second structure in a position in which the valve is open and actuable by movement of said first structure toward said second position upon release of said first latch means to automatically release said second structure for valve closing movement;
a resetting shaft manually movable rotatively about said second axis;
said second structure having a portion disposed about said shaft to mount said second structure for said swinging movement about said second axis;
said second yielding means being a coil spring disposed about said shaft and yieldingly urging said second structure to said position in which said valve is closed;
a sleeve disposed about said shaft and attached thereto for rotation therewith and having a shoulder engageable with said second structure to swing it toward said open valve position upon manual rotation of said shaft in a first direction;
said shoulder having a lost motion relationship with respect to said second structure enabling the shaft and sleeve and its shoulder to return rotatively in a second and opposite direction relative to said second structure while the second structure remains in said position in which the valve is open; and
additional yielding means comprising an additional coil spring disposed about said shaft and yieldingly urging said resetting shaft and sleeve rotatively in said second and opposite direction independently of said second structure.

15. The combination as recited in claim 14, including markings carried by said shaft for rotary movement therewith about said second axis and which are positioned to be viewed only when said shaft is in a position to which it is urged rotatively by said additional yielding means, there being means carried by said second structure for rotary movement therewith about said second axis and which block said markings from view when said valve is in closed position.

16. The combination comprising:
a first structure mounted for swinging movement about a first axis;
first yielding means urging said first structure about said first axis from a first position toward a second position;
first latch means for releasably retaining said first structure in said first position;
shock actuated mechanism responsive to shock forces to release said first latch means for movement of said first structure by said yielding means to said second position;

a second structure including a valve and which is mounted to swing about a second axis;

second yielding means urging said second structure toward a position in which the valve is closed;

second latch means releasably retaining said second structure in a position in which the valve is open and actuable by movement of said first structure toward said second position upon release of said first latch means to automatically release said second structure for valve closing movement;

a resetting member mounted for manual rotary movement about said second axis in a first rotary direction to swing said second structure in that direction and to said position in which the valve is open;

said resetting member having a lost motion connection with said second structure enabling returning movement of the resetting member in an opposite rotary direction and to a predetermined position independently of said second structure and while the second structure remains in its open valve position;

additional yielding means urging said resetting member rotatively to said predetermined position; and indicator means visible to a user to indicate when said valve is in open position and said resetting member is in said predetermined position thereof.

17. The combination as recited in claim 16, in which said indicator means include markings carried by said shaft and positioned to be seen by a user only when said resetting member is in said predetermined position thereof, and means carried by said second structure for swinging movement therewith and operable to block viewing of said markings when said valve is in closed position.

18. The combination comprising:
a first structure mounted for swinging movement about a first axis;

first yielding means urging said first structure about said first axis from a first position toward a second position;

first latch means for releasably retaining said first structure in said first position;

shock actuated mechanism responsive to shock forces to release said first latch means for movement of said first structure by said yielding means to said second position;

a second structure including a valve and which is mounted to swing about a second axis;

second yielding means urging said second structure toward a position in which the valve is closed; and second latch means releasably retaining said second structure in a position in which the valve is open and actuable by movement of said first structure toward said second position upon release of said first latch means to automatically release said second structure for valve closing movement;

said shock actuated mechanism including a pedestal, a weight normally resting on an upper surface of said pedestal and displaceable therefrom by shock forces, an element disposed about said pedestal and displaceable downwardly by said weight when the weight is displaced laterally relative to the pedestal by shock forces, and a parallelogram assembly actuable by downward movement of said element to release said first latch means.

19. The combination as recited in claim 18, in which said first and second axes are parallel to one another, and said first and second structures are mounted to swing generally toward one another in setting said first and second latch means, there being a shaft mounting said second structure for swinging movement about said second axis and having a lost motion connection with said second structure to reset the second structure and valve in first rotary direction about said second axis and to the open valve position of the second structure, said lost motion connection enabling returning rotary movement of said shaft relative to said second structure in an opposite rotary direction, additional yielding means urging said shaft in said opposite direction independently of said second structure, said second structure having a portion near a free end thereof positioned to engage said first structure and deflect it toward said first position thereof for retention in that first position by said first latch means and in response to swinging movement of said second structure toward its open valve position, said second latch means including a shoulder or shoulders on said second structure engageable with said first structure to retain said second structure in its open valve position when the first structure is in said first position thereof.

20. The combination comprising:
a conduit containing a passage through which fluid flows and having a valve seat in said passage with a fluid passing opening through the valve seat;

a first structure mounted adjacent said passage for swinging movement about a first axis;

yielding means urging said first structure about said first axis from a first position toward a second position;

first latch means for releasably retaining said first structure in said first position;

shock actuated mechanism responsive to shock forces to release said first latch means for movement of said first structure by said yielding means to said second position;

a valve structure mounted to swing within said passage about a second axis and toward and away from said seat between a closed position in which the valve structure extends essentially across and closes said opening in the seat and an open position projecting generally perpendicular to the seat at a side thereof;

yielding means urging said valve structure toward said closed position; and second latch means;

said valve structure having a portion which swings within said passage between said open and closed positions of the valve structure and which is engageable by said second latch means to releasably retain the valve structure in said open position;

said second latch means being actuable by movement of said first structure toward said second position thereof to automatically release said valve structure for closing movement.

21. The combination as recited in claim 20, in which said second latch means include a latch element carried by said first structure for swinging movement therewith about said first axis and positioned to engage said portion of the valve structure in said first position of said first structure and retain said valve structure in open position.

22. The combination as recited in claim 20, including means for manually resetting said valve structure to said open position for retention in that position by said second latch means, and manually resetting said first structure to said first position thereof for retention therein by said first latch means.

23. The combination as recited in claim 20, including means acting to automatically reset said first structure from said second position thereof to said first position upon movement of said valve structure from closed position to open position.

24. The combination as recited in claim 20, including means accessible from outside said passage for manually swinging said valve structure from said closed position to said open position for retention in open position by said second latch means; said valve structure having a portion which, upon manual swinging movement of the valve structure to open position, is engageble with said first structure to swing it from said second position thereof to said first position for retention in said first position by said first latch means.

* * * * *